United States Patent Office 2,772,269
Patented Nov. 27, 1956

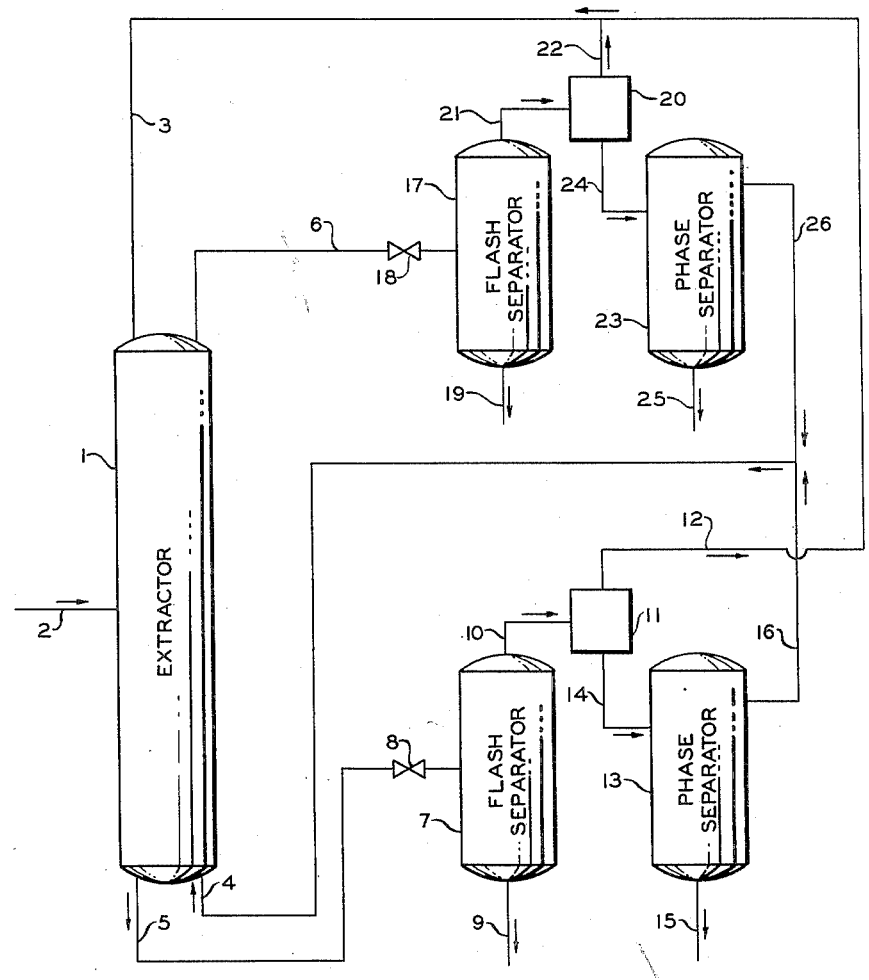

2,772,269

SEPARATION OF MIXED HETEROCYCLIC NITROGEN COMPOUNDS

William L. Stalder and Glenn H. Dale, Bartlesville, Okla., assignors to Phillips Petroleum Company, a corporation of Delaware Application August 31, 1953, Serial No. 377,322

10 Claims. (Cl. 260—283)

This invention relates to an improvement in the separation of heterocyclic nitrogen monomers which have a tendency to polymerize during purification. In one of its embodiments, this invention relates to an improvement in the process for the separation of mixed pyridines or of mixed quinolines. In one of its more specific embodiments, this invention relates to the separation of alkenylpyridines from alkylpyridines.

In the preparation of heterocyclic nitrogen compound monomers, they are usually recovered in admixture with other materials from the reactor. For example, vinylpyridines may be prepared from the corresponding ethylpyridines by passing the latter over an active high temperature dehydrogenation catalyst at temperatures between 450° C. and 800° C. The resulting mixture from the dehydrogenation vessel contains ethylpyridines, vinylpyridines, and small amounts of impurities such as picolines, lutidines and higher pyridines.

Purification of alkenylpyridines or alkenylquinolines contained in mixtures obtained by dehydrogenation of the corresponding alkyl compound or in other mixtures presents many difficulties. These arise because of the great ease with which alkenylheterocyclic nitrogen compounds polymerize, the closeness of boiling points between the alkenyl and the corresponding alkyl compounds, and the formation of water azeotropes and other difficultly separable fractions in the fractional distillation of such mixtures.

Of the many polymerizable heterocyclic nitrogen compounds known, 2-methyl-5-vinylpyridine (MVP) is the monomer of greatest commercial significance at the present time. Therefore to facilitate this discussion of the prior art and to later illustrate our invention, we will refer to the production and separation of MVP, however it should be understood that our invention is not limited to this particular monomer nor is our invention limited to mixtures obtained in any particular manner.

It has been found that many of the difficulties encountered in the separation of heterocyclic nitrogen compounds can be eliminated by partial fractionation followed by liquid-liquid extraction wherein carbonated water is used as a solvent. This method is fully disclosed in copending application of Karl H. Hachmuth, Serial No. 317,087, filed October 21, 1952, now Patent 2,755,282 issued July 17, 1956.

According to the above identified invention, nitrogen bases having different pH values are separated by contacting the mixture of nitrogen bases with water having dissolved therein sufficient carbon dioxide to form a nonaqueous, or raffinate phase, richer in the less basic nitrogen base on a solvent-free basis than the initial mixture and an aqueous extract phase richer in the more basic nitrogen base on a solvent-free basis than the initial mixture. Normally sufficient carbon dioxide is dissolved in water to insure a desired solubility level, say sufficient so that at least twice as much of the mixture of nitrogen bases dissolves in the solution as would dissolve in the water in the absence of carbon dioxide. The system will normally operate under a $CO_2$ atmosphere, and the amount of $CO_2$ dissolved will be controlled by regulating the pressure and temperature. It should be obvious to those skilled in the art that the desired $CO_2$ level in solution can be maintained by keeping the solution under pressure by any means.

The capacity of a liquid-liquid extraction column wherein carbonated water is used as the solvent in the separation of pyridines or quinolines is limited due to the closeness of the densities of the solvent and nitrogen base phases and also by the relatively high viscosity of the nitrogen base phase.

We have found that the operation of a liquid-liquid extraction column using carbonated water (carbonic acid or $CO_2$ dissolved in water) for the separation of alkyl nitrogen bases from alkenyl nitrogen bases can be greatly improved by introducing a substance of relatively low density into the system. Therefore an object of this invention is to increase the capacity of an extraction column wherein an aqueous solution of carbon dioxide is employed to extract one or more pyridines or quinolines from a material consisting essentially of mixed pyridines or quinolines.

This invention is applicable to alkylpyridines containing at least one alkyl group having at least 2 carbon atoms, and alkenylpyridines corresponding thereto. Di-, tri-, and tetralkyl pyridines with the alkyl substituents being present in various positions on the pyridine nucleus can be separated from corresponding alkenylpyridines wherein the double bond can be in a vinyl group or in the alpha position in carbon chains of three or more carbon atoms in length. 2-methyl-5-vinylpyridine and 2-methyl-5-ethylpyridine make up one group which it is frequently desired to separate in accordance with this invention. The invention is applicable to other alkene and alkyne, heterocyclic nitrogen compounds such as vinylpyridine, alkyl and alkenyl substituted vinylpyridine where the substituent radical contains 1 to 4 carbon atoms, vinylquinoline, divinylquinoline, alkyl and alkenyl substituted vinyl and divinylquinolines where the substituent radical contains 1 to 4 carbon atoms, and the like, and like alkene, alkadiene, and alkyne substituted pyridines, quinolines, isoquinolines, piperidines, pyrroles, pyrrolidines, and pyrrolidones.

We will describe our invention in terms of mixed pyridines and in particular in terms of 2-methyl-5-vinylpyridine (MVP) and 2-methyl-5-ethyl-pyridine (MEP). The MVP-MEP mixture from a prefractionator, or from a reactor or from any other source, can be separated by a liquid-liquid extraction wherein an aqueous solution of $CO_2$ (carbon dioxide) is used as the extraction medium.

In the extraction of an alkyl pyridine from an alkenylpyridine with carbonated water there is very little difference in density between the carbonated water and the pyridine phase. This makes the capacity of any extraction unit very low. For example, in the separation of MEP from MVP by means of an aqueous solution of $CO_2$, the composition of the solvent phase (the carbonated water phase) at 70° F. is such that it has a specific gravity of approximately 0.994 while the specific gravity of the pyridine phase is 0.963 or a specific gravity difference of 0.031. At a temperature of 35° F., where the solubility of MEP in carbonated water is greatest and therefore the most favorable for extraction, the compositions are such that the specific gravity difference is only 0.025.

According to this invention, a greater specific gravity difference is obtained between the carbonated water phase and the pyridine phase by carrying out the extraction process in the presence of an added liquid of lower specific gravity than the pyridine phase, in which the pyridine is completely miscible and which is substantially insoluble in the carbonated water. The added liquid should be sufficiently low boiling that it can be easily separated from the pyridine by distillation. To illustrate our invention we will use pentane as an example of a suitable added liquid, however any material meeting the requirements set out herein is within the scope of this invention.

A solution made up of 20 wt. percent pentane and 80 wt. percent pyridine has a specific gravity at 70° F. of approximately 0.853. The specific gravity difference between this pyridine phase containing pentane and the solvent is then 0.14. The difference in specific gravity is thus increased more than fourfold, as compared with the difference existing in the absence of added pentane. As will be apparent from the specific examples shown hereinafter, this increased difference in specific gravity of the two phases results in a significant improvement in the operation of the extraction column.

Our invention broadly comprises subjecting a mixture of heterocyclic nitrogen compounds to an extraction step wherein the feed mixture is contacted with an aqueous solution of $CO_2$ (carbonic acid or carbonated water) in the presence of an added liquid of lower specific gravity than the feed, under suitable temperature and pressure conditions to cause formation of an extract phase enriched in at least one of the components of the feed and a raffinate phase, separating the two phases, recovering the extracted pyridine from the extract phase, and recovering the rejected pyridine from the raffinate phase.

The extraction step may be of the batch or continuous stirred mixing and settling type or it may be a continuous countercurrent extraction in a vertical tower. In the latter case the feed is introduced at a point intermediate the top and bottom of the tower and the extract solution is removed from the bottom of the tower. If desired, the bottom of the tower may be refluxed by heating the bottom to produce an internal reflux, by heating the extract outside the tower to produce a secondary raffinate phase which is returned to a point near the bottom of the tower as reflux, or by introducing a portion of the pyridine recovered from the extract by any means to a point near the bottom of the tower. However, our invention is not restricted to any particular extraction column nor to any particular method of supplying reflux to the extraction zone.

In any case, the presence of the added low-density material in any of these methods of effecting the extraction operation serves to greatly increase the rate of separation of the raffinate phase containing the low density material from the heavier aqueous extract phase. In multistage countercurrent extraction methods, this results in a greatly increased flooding velocity, thus increasing extraction tower capacity correspondingly.

We will illustrate our invention using pentane as the light hydrocarbon, but we do not limit our invention to this particular material. As was hereinbefore stated, any substance which has density less than that of the feed pyridine or heterocyclic compound and is completely miscible therewith, and which is substantially insoluble in carbonated water may be used. We prefer to use a paraffin or a monoolefin hydrocarbon of 3 to 8 carbon atoms since such materials are readily available commercially. Specific examples are propane, propene, n-butane, isobutane, 1-butene, 2-butene, the isomeric hexanes, hexenes, heptanes and heptenes, 2,4,6-trimethylpentane, 3-ethyl-4-heptene, n-octane, 1-octene, 2-octene, 2,4-dimethyl, 2-pentene, and 3-methyl-1-butene. Lower hydrocarbons such as methane and ethane are useful to the extent that they are soluble in the pyridine. The higher molecular weight hydrocarbons, such as nonane, decane, 4-ethyl-5-methyl-1-octane, 2-methyl-4-octene, 4-methyloctane, and 1-nonene, are also useful, however their specific gravities are higher and their boiling points approach those of the pyridines. The diolefins are, of course, polymerizable and are therefore objectionable for that reason. Cyclic and aromatic hydrocarbons are useful, but the specific gravities are higher than those of the aliphatic compounds of equal number of carbon atoms. However, certain of the advantages of the invention can be obtained with materials such as cyclohexane, cyclopropane, cyclopropene, 2,4-dimethyl cyclohexane, 2-ethyl-4-cyclohexene, cyclopentene, benzene, toluene, and the xylenes. In some instances the hydrocarbon may have a specific gravity as high as 0.9; however, we prefer to use those hydrocarbons having a specific gravity not greater than 0.8 at 20° C.

In addition to lowering the density of the pyridine phase, a light hydrocarbon also makes this phase more fluid or less viscous. This lowering of the viscosity also makes for more rapid separation of the two phases.

To further illustrate our invention, we will refer to the attached Figure 1 which is a schematic flow diagram of one embodiment of our invention.

Now referring to the drawing, a mixture of MEP-MVP is fed to the extractor 1 via conduit 2. At the same time carbonated water under the desired pressure is introduced into column 1 via conduit 3 and pentane is fed into column 1 via conduit 4. The MEP is soluble in the carbonated water and will be removed from the column as extract along with some pentane via conduit 5. The pentane acts as an internal reflux and, being miscible with the pyridines, lowers the specific gravity of the raffinate phase and is removed along with MVP and some carbonated water via conduit 6. The extract phase is admitted to flash evaporator 7 through pressure reducing valve 8. Heat may also be employed in this vessel to insure the complete separation of MEP from the solvent or further purifications may be carried out in subsequent vessels. The MEP is removed via conduit 9. The $CO_2$, $H_2O$, and $C_5$ (pentane) are flashed off through conduit 10 to condenser 11 where the $CO_2$ is removed via conduit 12 and is returned to the top of column 1 after being put into solution. The water and pentane are sent to phase separator 13 via conduit 14 where the water is removed via conduit 15 and is remixed with the $CO_2$ as solvent for column 1. The pentane is returned to column 1 via conduits 16 and 4.

The raffinate phase from column 1 goes to flash evaporator 17 via conduit 6 through pressure reducing valve 18. Heat may be employed in this vessel to insure the complete separation of MVP from the other materials. The MVP is removed via conduit 19. The $CO_2$, water and pentane are sent to condenser 20 via conduit 21. The $CO_2$ is separated from the $H_2O$ and pentane in the cooler 20 through conduit 22 and is returned to column 1 after being remixed with water. The water and pentane go to phase separator 23 via conduit 24 and the water is removed via conduit 25 and after being recarbonated is returned to top of extractor 1. The pentane is removed through conduit 26 and is returned to the bottom of extractor 1 via conduit 4.

We have illustrated by showing the hydrocarbons being added as reflux. However, the hydrocarbons can be added with the feed or at any point in the extraction column. For example, the hydrocarbon can be added along with the feed, and either MEP or additional hydrocarbon can be refluxed to the column.

In accordance with one embodiment of our invention, at least a portion of the light hydrocarbon is added to the feed prior to the introduction thereof into the extraction column. This method of operation has the further advantage that the added light hydrocarbon will cause the precipitation of any polymer which may be present in solution in the feed. This polymer may then be removed by decantation, filtration, or other suitable method, and the remaining solution fed to the extraction process of this invention. The removal of polymer from an MEP-MVP mixture by means of an added light hydrocarbon, followed by removal of the added hydrocarbon prior to the final MEP-MVP separation, is disclosed and claimed in the copending application of Haskell and McKay, Serial No. 363,248, filed June 23, 1953.

To further illustrate our invention, the following working examples are given. These examples are illustrative of our process only and we do not limit our invention to the specific heterocyclic compounds, the hydrocarbon, nor to the specific equipment used in these examples but we can use any of the hydrocarbons in the separation of any of the heterocyclic compounds hereinbefore indicated.

*Example I*

A feed containing 80 percent mixed pyridines and 20 percent n-pentane wherein said mixed pyridines consisted of 80 percent MVP and 20 percent MEP was charged to a 20-foot tall 2-inch I. D. spray column at 200 p. s. i. g. and 70° F. A solvent consisting of a saturated aqueous solution of $CO_2$ was charged to the column countercurrent to the pyridine-pentane mixture at a ratio of 9 volumes of solvent per unit volume of pyridine-pentane mixture. The rate of feed was continuously increased until the flood point of the column was reached at a solvent rate of 900 ml./min. and a mixed pyridine-pentane feed rate of 100 ml./min.

*Example II*

A run was made on the same column as was used in Example I using the same solvent, temperature and pressure as was used in Example I. The feed was 80 percent MVP–20 percent MEP mixture and no light hydrocarbon. The flood point was reached at a solvent rate of 300 ml./min. and a pyridine feed rate of 30 ml./min.

*Example III*

A third run was made in the same column as Example I and under the same temperature and pressure conditions. The feed consisted of 80 percent mixed pyridine (80% MVP–20% MEP) and 20 percent n-pentane. The ratio of solvent to feed was approximately 9/1 and the rate of feed was approximately 55 percent of the flood rate. The height equivalent to one theoretical plate (HETP) was 8.33 feet.

*Example IV*

A fourth run was made in the same column as Example I and under the same temperature and pressure conditions. The feed consisted of mixed pyridines (80% MVP–20% MEP) and no light hydrocarbon. The ratio of solvent to feed was approximately 10/1 and the rate of feed was approximately 90 percent of the flood rate. The HETP was 14.7 feet.

A comparison of the data in Examples I and II clearly shows the advantages of our invention in terms of column capacity. It can be seen that using 20% pentane in the feed mix, the capacity was increased 266 percent.

A comparison of the data in Examples III and IV shows that even though the column was operating at a higher rate in Example III (900×.55=495 ml. solvent/minute) than it was in Example IV (300×.90=270 ml. solvent/minute) the efficiency was much better (8.33 feet HETP vs 14.2 feet HETP).

We have disclosed a process for increasing the capacity of an extraction vessel wherein mixed heterocyclic compounds are being separated by means of extraction with carbonated water. We have illustrated our invention using a mixture of heterocyclic compounds comprising MEP and MVP and using pentane as the hydrocarbon of our invention. Those skilled in the art, given this disclosure will readily see many modifications which can be made in this disclosure without departing from the spirit and scope of our invention.

We claim:

1. An improvement in separating alkenyl heterocyclic nitrogen compounds from corresponding alkyl heterocyclic nitrogen compounds by liquid-liquid extraction wherein carbonated water is the solvent, said improvement comprising introducing a hydrocarbon having a specific gravity less than that of said mixture into the extraction vessel.

2. An improvement in separating alkenyl heterocyclic nitrogen compounds from corresponding alkyl heterocyclic nitrogen compounds by liquid-liquid extraction wherein carbonated water is the solvent, said improvement comprising the introduction into the extraction vessel of a hydrocarbon which is completely miscible with the mixed heterocyclic nitrogen compounds and is substantially immiscible with the solvent, said hydrocarbon having a specific gravity less than that of said mixture, and said specific gravity being not more than 0.9 at 20° C.

3. An improvement in separating alkenyl heterocyclic nitrogen compounds from corresponding alkyl heterocyclic nitrogen compounds by liquid-liquid extraction wherein carbonated water is the solvent, said improvement comprising the introduction into the extraction vessel of a hydrocarbon which is completely miscible with the heterocyclic nitrogen compounds and is substantially immiscible with the solvent, said hydrocarbon being selected from the group consisting of paraffins and monoolefin hydrocarbons containing 3 to 8 carbon atoms.

4. The improvement of claim 3 wherein the alkenyl heterocyclic nitrogen compound is an alkenylpyridine and the alkyl heterocyclic nitrogen compound is an alkylpyridine.

5. The improvement of claim 4 wherein the alkenylpyridine is 2-methyl-5-vinylpyridine and the alkylpyridine is 2-methyl-5-ethylpyridine.

6. The improvement of claim 3 wherein the alkenyl heterocyclic nitrogen compound is an alkenyl quinoline and the alkyl heterocyclic nitrogen compound is an alkylquinoline.

7. An improvement in separating alkenylpyridine from a mixture comprising alkenyl pyridine and alkylpyridines by liquid-liquid extraction wherein a saturated aqueous solution of $CO_2$ is the solvent, said improvement comprising the introduction of a hydrocarbon into the extraction vessel, said hydrocarbon being selected from the group consisting of paraffin and monoolefin hydrocarbons containing 3 to 8 carbon atoms.

8. The improvement of claim 7 wherein the alkenylpyridine is 2-methyl-5-vinylpyridine, the alkylpyridine is 2-methyl-5-ethylpyridine, and the hydrocarbon is n-pentane.

9. An improvement in separating alkenylpyridines from a mixture comprising alkenylpyridines and alkylpyridines by liquid-liquid extraction wherein a saturated aqueous solution of $CO_2$ is the solvent, said improvement comprising introducing the said mixture of pyridines into an extraction vessel so as to contact a gravitating flow of said $CO_2$ solution and an ascending flow of a hydrocarbon said hydrocarbon having a specific gravity of less than 0.8 at 20° C.

10. The improvement of claim 9 wherein the hydrocarbon is selected from the group consisting of paraffin and monoolefin hydrocarbons containing 3 to 8 carbon atoms.

References Cited in the file of this patent

UNITED STATES PATENTS

| | | |
|---|---|---|
| 1,965,828 | Fox | July 10, 1934 |
| 2,035,583 | Bailey | Mar. 31, 1936 |
| 2,035,584 | Bailey | Mar. 31, 1936 |
| 2,311,134 | Schutt | Feb. 16, 1943 |
| 2,393,666 | Van der Hoeven | Jan. 29, 1946 |
| 2,486,778 | Doumani | Nov. 1, 1949 |
| 2,611,769 | Hays | Sept. 23, 1952 |
| 2,716,120 | Haskell | Aug. 23, 1955 |